US012657432B2

(12) United States Patent
Kobayashi et al.

(10) Patent No.: US 12,657,432 B2
(45) Date of Patent: Jun. 16, 2026

(54) BACKPROPAGATION-BASED EXPLAINABILITY METHOD FOR UNSUPERVISED ANOMALY DETECTION MODELS BASED ON AUTOENCODER ARCHITECTURES

(71) Applicant: Oracle International Corporation, Redwood Shores, CA (US)

(72) Inventors: Kenyu Kobayashi, Lausanne (CH); Arno Schneuwly, Effretikon (CH); Renata Khasanova, Zurich (CH); Matteo Casserini, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 995 days.

(21) Appl. No.: 17/873,491

(22) Filed: Jul. 26, 2022

(65) Prior Publication Data

US 2024/0037372 A1 Feb. 1, 2024

(51) Int. Cl.
| | |
|---|---|
| *G06N 3/045* | (2023.01) |
| *G06N 3/084* | (2023.01) |
| *G06N 3/088* | (2023.01) |

(52) U.S. Cl.
CPC ............. *G06N 3/045* (2023.01); *G06N 3/084* (2013.01); *G06N 3/088* (2013.01)

(58) Field of Classification Search
CPC ........ G06N 3/045; G06N 3/084; G06N 3/088; G06N 3/0455
See application file for complete search history.

(56) References Cited

U.S. PATENT DOCUMENTS

| | | | |
|---|---|---|---|
| 2018/0018553 A1* | 1/2018 | Bach ..................... | G06F 40/279 |
| 2021/0049503 A1* | 2/2021 | Nourian .............. | G06F 11/3466 |

(Continued)

OTHER PUBLICATIONS

Bach S, Binder A, Montavon G, Klauschen F, Müller KR, Samek W. On pixel-wise explanations for non-linear classifier decisions by layer-wise relevance propagation. PloS one. Jul. 10, 2015;10(7):e0130140. (Year: 2015).*

(Continued)

*Primary Examiner* — Oluwatosin Alabi
(74) *Attorney, Agent, or Firm* — Hickman Becker Bingham Ledesma LLP

(57) ABSTRACT

The present invention relates to machine learning (ML) explainability (MLX). Herein are techniques for a novel relevance propagation rule in layer-wise relevance propagation (LRP) for feature attribution-based explanation (ABX) for a reconstructive autoencoder. In an embodiment, a reconstruction layer of a reconstructive neural network in a computer generates a reconstructed tuple that is based on an original tuple that contains many features. A reconstruction residual cost function calculates a reconstruction error that measures a difference between the original tuple and the reconstructed tuple. Applied to the reconstruction error is a novel reconstruction relevance propagation rule that assigns a respective reconstruction relevance to each reconstruction neuron in the reconstruction layer. Based on the reconstruction relevance of the reconstruction neurons, a respective feature relevance of each feature is determined, from which an ABX explanation may be automatically generated.

19 Claims, 7 Drawing Sheets

(56) References Cited

U.S. PATENT DOCUMENTS

| | | | |
|---|---|---|---|
| 2022/0277550 A1* | 9/2022 | Bäckström | G06V 10/776 |
| 2022/0301658 A1* | 9/2022 | Zamft | G16B 40/00 |

OTHER PUBLICATIONS

Kindermans PJ, Schütt KT, Alber M, Müller KR, Erhan D, Kim B, Dähne S. Learning how to explain neural networks: Patternnet and patternattribution. arXiv preprint arXiv:1705.05598. May 16, 2017. (Year: 2017).*

Samek W, Montavon G, Lapuschkin S, Anders CJ, Müller KR. Explaining deep neural networks and beyond: A review of methods and applications. Proceedings of the IEEE. Mar. 4, 2021;109(3):247-78. (Year: 2021).*

Kim SG, Ryu S, Kim H, Jin K, Cho J. Enhancing the Explainability of AI Models in Nuclear Power Plants with Layer-wise Relevance Propagation. InProceedings of the Transactions of the Korean Nuclear Society Virtual Autumn Meeting, Jeju, Korea Oct. 21, 2021 (pp. 21-22). (Year: 2021).*

Adesuyi TA, Kim Bm. A neuron noise-injection technique for privacy preserving deep neural networks. Open Computer Science. Jan. 1, 2020;10(1):137-52. (Year: 2020).*

Er NA, Ba ML, Abdessalem T, Bressan S. Tuple reconstruction. InInternational Conference on Database Systems for Advanced Applications May 12, 2018 (pp. 239-254). Cham: Springer International Publishing. (Year: 2018).*

Montavon et al., "Explaining Nonlinear Classification Decisions with Deep Taylor Decomposition", Pattern Recognition, vol. 65, https://www.sciencedirect.com/science/article/pii/S0031320316303582, dated May 2017, 12 pages.

Ancona et al., "Towards Better Understanding of Gradient-Based Attribution Methods for Deep Neural Networks", ICLR 2018, Mar. 7, 2018, 16 pages.

Arras et al., "Evaluating Recurrent Neural Network Explanations", Jun. 4, 2019, 14 pages.

Arras et al., "Explaining and Interpreting LSTMs", Sep. 25, 2019, 28 pages.

Arras et al., "Explaining Recurrent Neural Network Predictions in Sentiment Analysis", Aug. 4, 2017, 10 pages.

Bach et al., "On Pixel-Wise Explanations for Non-Linear Classifier Decisions by Layer-Wise Relevance Propagation", PLoS ONE, Jul. 2015, 46 pages.

Bohle et al., "Layer-Wise Relevance Propagation for Explaining Deep Neural Network Decisions in MRI-Based Azheimer's Disease Classification" Frontiers in Aging Neuroscience, vol. 11, Jul. 2019, 17 pages.

Eitel et al., "Uncovering convolutional neural network decisions for diagnosing multiple sclerosis on conventional MRI using layer-wise relevance propagation", Apr. 18, 2019, 15 pages.

Gholizadeh et al., "Model Explainability in Deep Learning Based Natural Language Processing", Jun. 14, 2021, 12 pages.

"Shap.KernelExplainer", available: https://shap-Irjball.readthedocs.io/en/latest/generated/shap.KernelExplainer.html, 5 pages.

Lundberg et al., "A Unified Approach to Interpreting Model Predictions", 31st Conference on Neural Information Processing Systems, https://proceedings.neurips.cc/paper/2017/file/8a20a8621978632d76c43dfd28b67767-Paper.pdf, dated 2017, 10 pages.

Yeom et al., "Pruning by explaining: A novel criterion for deep neural network pruning", Pattern Recognition, vol. 115, Jul. 2021, 14 pages.

Montavon et al., "Layer-Wise Relevance Propagation: An Overview", Sep. 2019, 19 pages.

Montavon et al., "Methods for interpreting and understanding deep neural networks", Digital Signal Processing, vol. 73, Feb. 2018, 15 pages.

Ribeiro et al., "Why Should I Trust You? Explaining the Predictions of Any Classifier", In Proceedings of the 22nd ACM SIGKDD International Conference on Knowledge Discovery and Data Mining, dated Aug. 2016, 10 pages.

Rumelhart et al., "Learning Internal Representations by Error Propagation", Chapter 8, MIT Press, Cambridge, MA, USA, 1986, 46 pages.

Samek et al., "Explainable Artificial Intelligence: Understanding, Visualizing and Interpreting Deep Learning Models", Aug. 2017, 8 pages.

Samek et al., "Interpreting the Predictions of Complex ML Models by Layer-wise Relevance Propagation", Nov. 2016, 5 pages.

Shrikumar et al., "Learning Important Features Through Propagating Activation Differences", Oct. 2019, 9 pages.

Sundararajan et al., "Axiomatic Attribution for Deep Networks", Proceedings of the 34th International Conference on Machine Learning, Jun. 13, 2017, 11 pages.

Yang et al., "Explaining Therapy Predictions with Layer-wise Relevance Propagation in Neural Networks", In 2018 IEEE International Conference on Healthcare Informatics (ICHI), 2018, 11 pages.

Kobayashi et al., "Validation Metric for Attribution-based Explanation Methods for Anomaly Detection Models", Feb. 22, 2022, 9 pages.

Zeiler et al., "Visualizing and Understanding Convolutional Networks", Dept. of Computer Science, Courant Institute, New York University, Nov. 28, 2013, 11 pages.

* cited by examiner

FIG. 2

DEEP TAYLOR DECOMPOSITION 202

$$R_j = f_{R_j}\left(\{x_i\}\right)$$

$$= f_{R_j}\left(\{\tilde{x}_i\}(\vartheta)\right) + \left(\left.\frac{\partial f_{R_j}}{\partial\{x_i\}}\right|_{\{\tilde{x}_i\}(\vartheta)}\right)^T \cdot \left(\{x_i\} - \{\tilde{x}_i\}(\vartheta)\right) + \varepsilon_j$$

$$= 0 + \sum_i \underbrace{\left.\frac{\partial f_{R_j}}{\partial x_i}\right|_{\{\tilde{x}_i\}(\vartheta)} \cdot \left(x_i - \tilde{x}_i^{(\vartheta)}\right)}_{R_{i\leftarrow j}} + \varepsilon_j,$$

DEEP TAYLOR DECOMPOSITION 204

$$R_i = \sum_j \left.\frac{\partial f_{R_j}}{\partial x_i}\right|_{\{\tilde{x}_i\}(\vartheta)} \cdot \left(x_i - \tilde{x}_i^{(\vartheta)}\right)$$

FIG. 3

DEEP TAYLOR DECOMPOSITION  300

$$R_{re} = r(x)$$

$$= \underbrace{r(y)}_{0} + \nabla r(y)^{\mathsf{T}} \cdot (x - y) + \frac{1}{2}(x - y)^{\mathsf{T}} \cdot H_r(y) \cdot (x - y) + \underbrace{\varepsilon_{re}}_{0}$$

$$= \underbrace{\sum_i \frac{-2}{m}(y_i - y_i)(x_i - y_i)}_{first\text{-}order\ term} + \underbrace{\frac{1}{2} * \frac{2}{m}(x_i - y_i)^2}_{second\text{-}order\ term}$$

$$= \underbrace{\sum_i \frac{1}{m}(x_i - y_i)^2}_{R_{i \leftarrow re}}$$

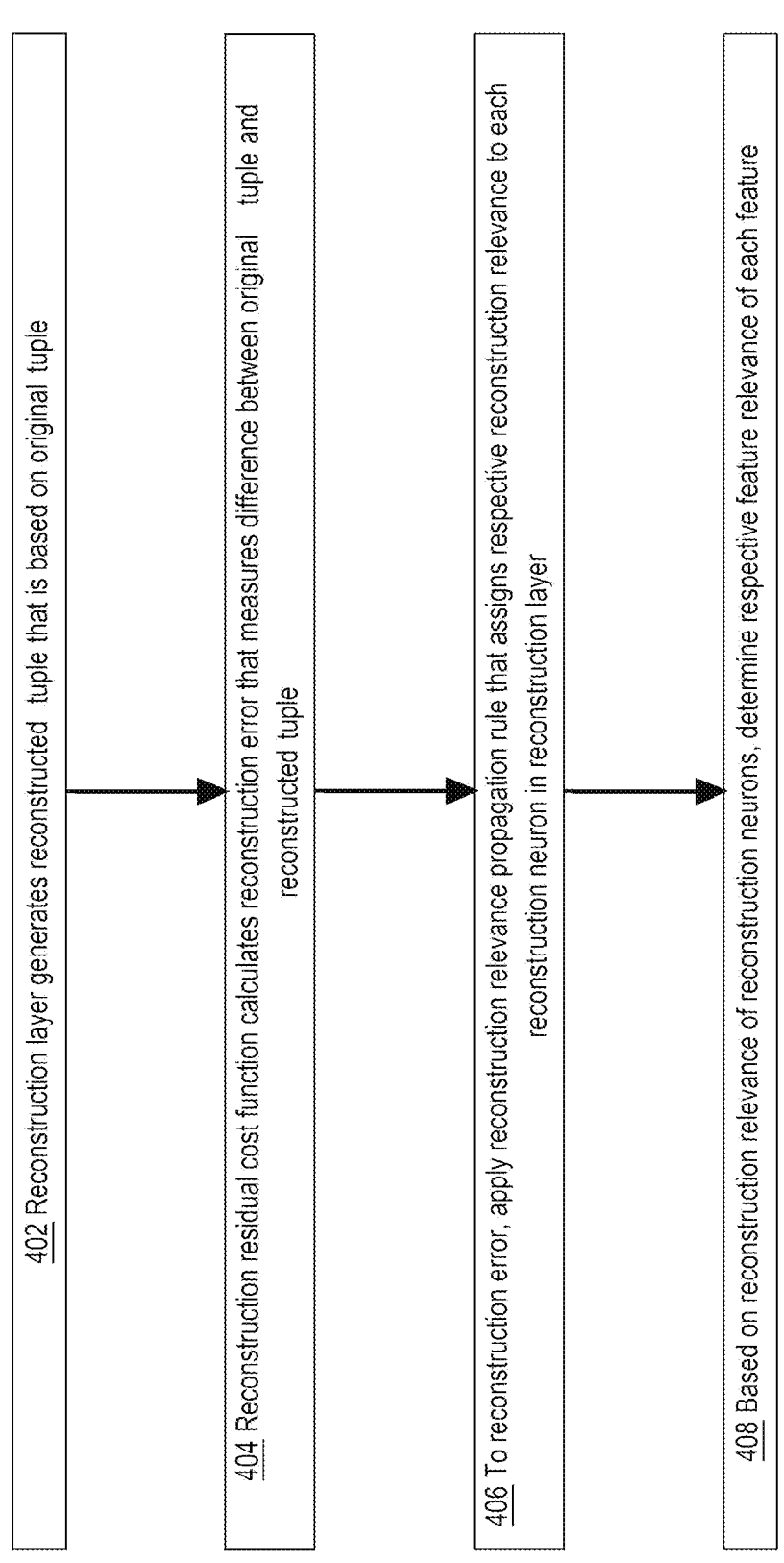

FIG. 4

402 Reconstruction layer generates reconstructed tuple that is based on original tuple 404 Reconstruction residual cost function calculates reconstruction error that measures difference between original tuple and reconstructed tuple 406 To reconstruction error, apply reconstruction relevance propagation rule that assigns respective reconstruction relevance to each reconstruction neuron in reconstruction layer 408 Based on reconstruction relevance of reconstruction neurons, determine respective feature relevance of each feature 502 Reconstructive neural network accepts feature vector that represents database statement 504 Reconstructive neural network infers inference 506 Applying reconstruction relevance propagation rule to reconstruction residual cost function

FIG. 7

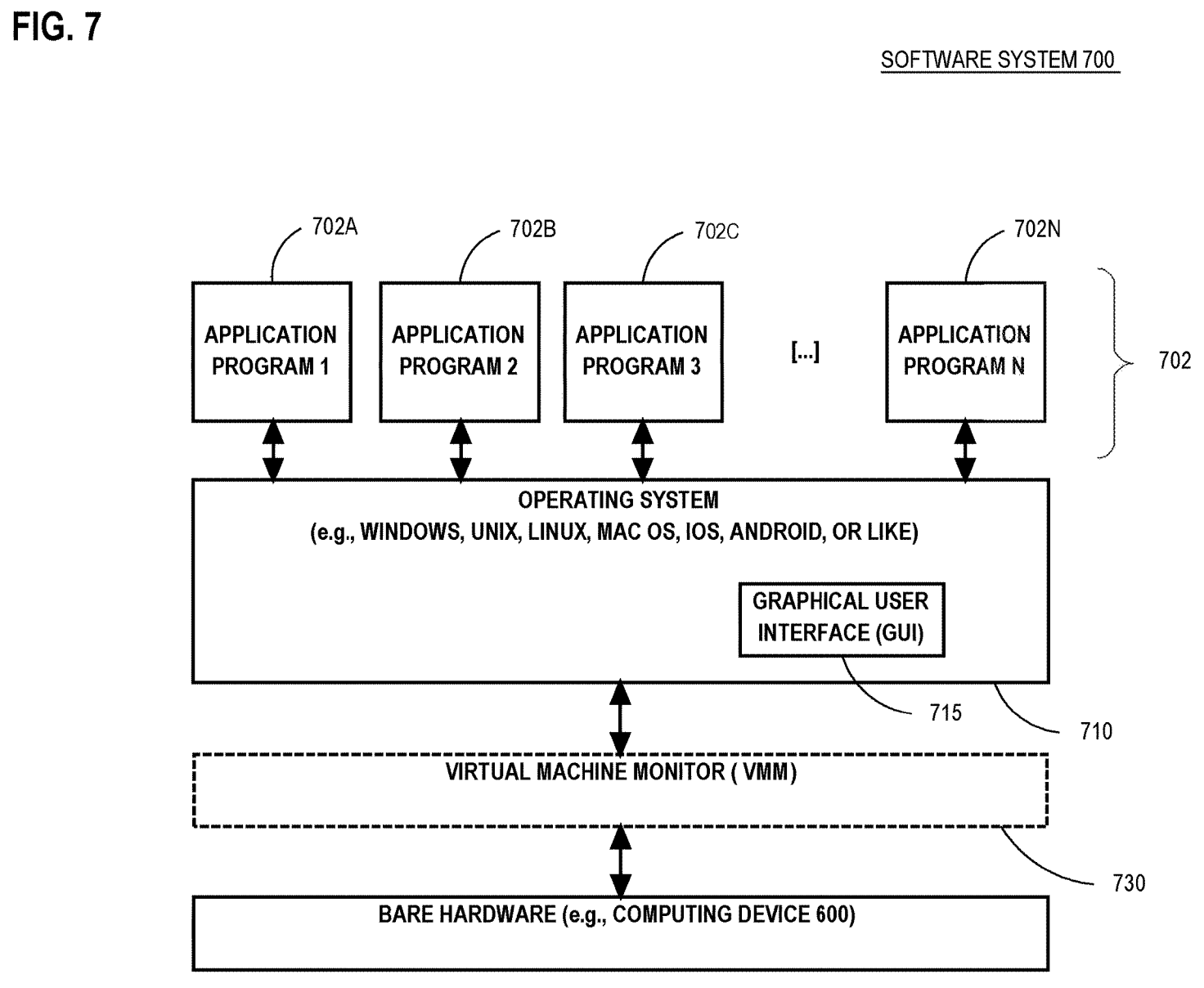

SOFTWARE SYSTEM 700

702

702N

APPLICATION PROGRAM N

702C

APPLICATION PROGRAM 3

702B

APPLICATION PROGRAM 2

702A

APPLICATION PROGRAM 1

[...]

OPERATING SYSTEM
(e.g., WINDOWS, UNIX, LINUX, MAC OS, IOS, ANDROID, OR LIKE)

710

GRAPHICAL USER INTERFACE (GUI)

715

VIRTUAL MACHINE MONITOR (VMM)

730

BARE HARDWARE (e.g., COMPUTING DEVICE 600)

BACKPROPAGATION-BASED EXPLAINABILITY METHOD FOR UNSUPERVISED ANOMALY DETECTION MODELS BASED ON AUTOENCODER ARCHITECTURES

FIELD OF THE INVENTION

The present invention relates to machine learning (ML) explainability (MLX). Herein are techniques for a novel relevance propagation rule in layer-wise relevance propagation (LRP) for feature attribution-based explanation (ABX) for a reconstructive autoencoder.

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Deep learning is a prime example of this trend. Other ML algorithms, such as typical neural networks, may only contain a few layers of densely connected neurons, whereas deep learning algorithms, such as convolutional neural networks, may contain tens to hundreds of layers of neurons performing very different operations. Increasing the depth of the neural model and heterogeneity of layers provides many benefits. For example, providing more depth can increase the capacity of the model, improve the generalization of the model, and provide opportunities for the model to filter out unimportant features, while including layers that perform different operations can greatly improve the performance of the model. However, these optimizations come at the cost of increased complexity and reduced human interpretability of model operation.

Explaining and interpreting the results from complex deep learning models is a challenging task compared to many other ML models. For example, a decision tree may perform binary classification based on N input features. During training, the features that have the largest impact on the class predictions are inserted near the root of the tree, while the features that have less impact on class predictions fall near the leaves of the tree. Feature importance can be directly determined by measuring the distance of a decision node to the root of the decision tree.

Such models are often referred to as being inherently interpretable. However, as the complexity of the model increases (e.g., the number of features or the depth of the decision tree increases), it becomes increasingly challenging to interpret an explanation for a model inference. Similarly, even relatively simple neural networks with a few layers can be challenging to interpret, as multiple layers combine the effects of features and increase the number of operations between the model inputs and outputs. Consequently, there is a requirement for advanced techniques to aid with the interpretation of complex neural and deep learning models.

MLX has recently gotten increasing attention because understanding why an ML model makes a certain prediction can be as crucial as the prediction's accuracy in many applications. Feature attribution-based explanation (ABX) methods are often used to explain the rationale behind an ML model's decision-making process. ABX methods may operate by indicating how much each feature that was input into an ML model contributed to the predictions for each given instance.

In the field of anomaly detection, one prominently used ML model architecture of deep neural networks (DNNs) is the autoencoder. Autoencoder architecture is mainly designed to transcode the input data into a compressed (e.g. dimensionality reduction), meaningful representation, and decode it back to the original size such that a reconstruction of the input is as similar as possible to the original input.

By training to minimize reconstruction error on a large data collection, an autoencoder learns an informative representation of the data in lower dimensionality (encoding step) such that the reconstruction into the original size (decoding step) has a small error. An autoencoder is often used to solve an anomaly detection problem. Because anomalous tuples are not correctly reconstructed from the lower dimensionality representation, an indicator of interest for anomaly detection is the reconstruction error. A tuple is considered anomalous if a trained autoencoder has significantly large reconstruction error for the tuple.

When an autoencoder fails to properly reconstruct a given input, insights and understanding of the rationale behind that failure may be needed. Despite a large spectrum of explainability methods, only a small few can process the internals of an autoencoder. Most MLX methods that can accommodate an autoencoder instead treat the autoencoder as opaque (i.e. black box). Such generality is exceedingly expensive in time and space for explanation generation.

BRIEF DESCRIPTION OF THE DRAWINGS

In the drawings:

FIG. 2 depicts arithmetic equalities for a deep Taylor decomposition of an example layer formula.

FIG. 3 depicts arithmetic equalities for a deep Taylor decomposition of an example reconstruction error formula.

FIG. 4 is a flow diagram that depicts an example computer process that uses a novel reconstructive relevance propagation rule in LRP for ABX for a reconstructive neural network;

FIG. 7 is a block diagram that illustrates a basic software system that may be employed for controlling the operation of a computing system.

DETAILED DESCRIPTION

Figure 1:
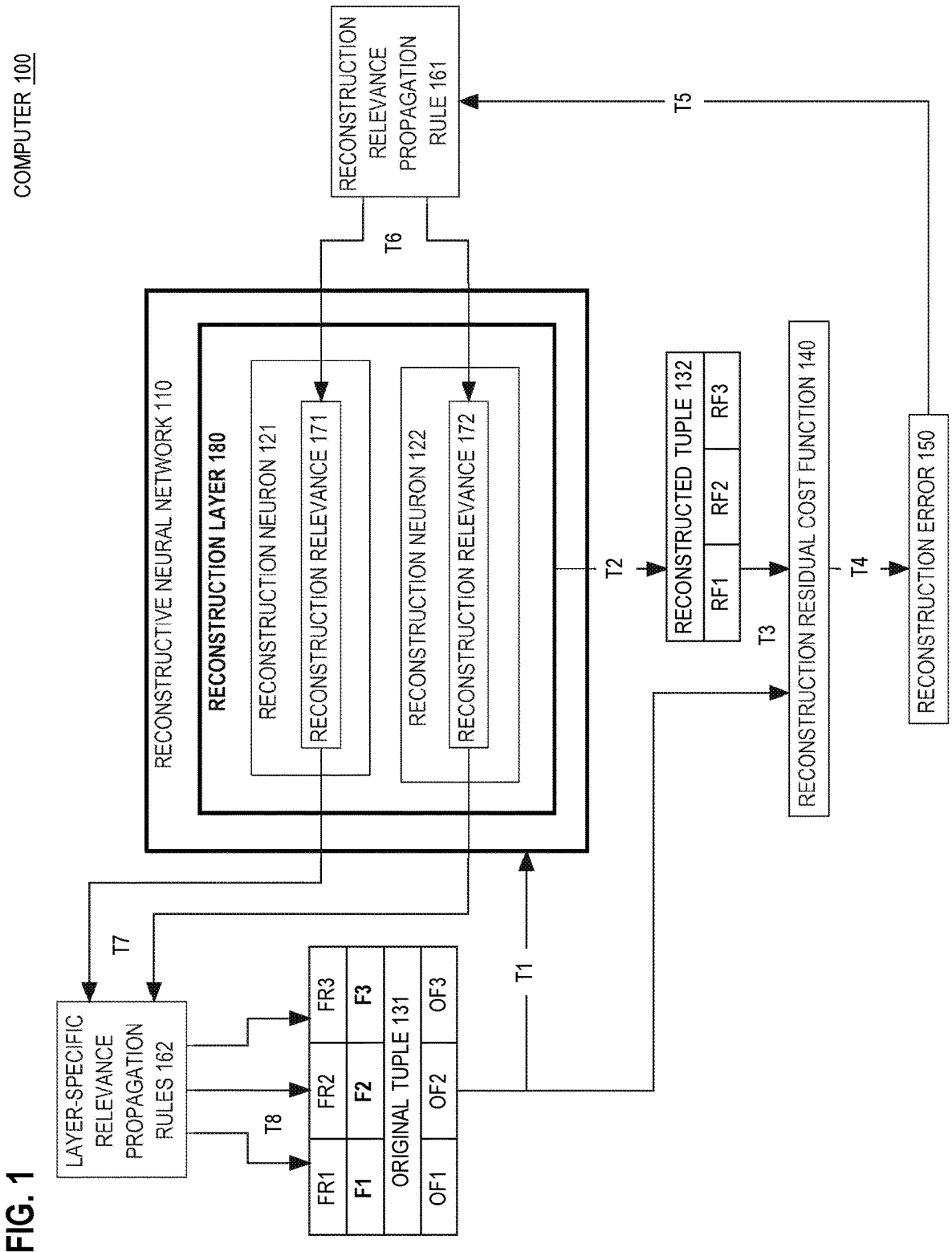
FIG. 1 is a block diagram that depicts an example computer that uses a novel reconstructive relevance propagation rule in layer-wise relevance propagation (LRP) for feature attribution-based explanation (ABX) for a reconstructive neural network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a machine learning (ML) explanation approach that assigns relevance attributions to input features to explain an autoencoder's reconstruction error on any given datapoint. This approach includes ML explainability (MLX) techniques for a novel relevance propagation rule in layer-wise relevance propagation (LRP) for feature attribution-based explanation (ABX) for a reconstructive autoencoder.

LRP computes input attributions by directly propagating an artificial neural network's (ANN) prediction f(x) backward in the ANN using a set of propagation rules designed according to neural layer types. For example, a deep neural network (DNN) may have several kinds of neural layers. Experiments have shown that the quality of explanations that LRP delivers outperforms some other best of breed explanation methods.

LRP may use propagation rules for a variety of neural layer types, such as fully connected layers, pooling layers, or convolutional layers as discussed herein. A propagation rule for the residual cost function of a neural network does not exist in the state of the art. Herein is a novel propagation rule for applying LRP to autoencoders. Deep Taylor decomposition (DTD) is used to formulate such a propagation rule.

When explaining a reconstruction error of an autoencoder with LRP, the relevance propagation starts with the reconstruction error, whose relevance is set to its own value, r(x). Various techniques and the novel relevance propagation rule are used to propagate relevance back to the neurons of the previous layer (i.e. output layer of the autoencoder). This approach uses DTD to derive a relevance propagation rule for the residual cost function that measures the reconstruction error of the autoencoder.

While other LRP rules are defined heuristically, DTD derives propagation rules which are instead theoretically justified. This approach has the following novel aspects:

A relevance propagation function for the residual cost function.

An explanation framework based on backpropagation techniques to provide explanations for autoencoders.

This approach has the following advantages:

Low algorithmic complexity with a single backpropagation pass.

Straightforward implementation that does not require the definition of a baseline input as in other approaches as discussed herein.

In an LRP embodiment, a reconstruction layer of a reconstructive neural network in a computer generates a reconstructed tuple that is based on an original tuple that contains many features. A reconstruction residual cost function calculates a reconstruction error that measures a difference between the original tuple and the reconstructed tuple. Applied to the reconstruction error is a novel reconstruction relevance propagation rule that assigns a respective reconstruction relevance to each reconstruction neuron in the reconstruction layer. Based on the reconstruction relevance of the reconstruction neurons, a respective feature relevance of each feature is determined, from which an attribution-based explanation (ABX) may be automatically generated.

1.0 Example Computer

FIG. 1 is a block diagram that depicts an example computer 100, in an embodiment. For machine learning (ML) explainability (MLX), computer 100 uses novel reconstructive relevance propagation rule 161 in layer-wise relevance propagation (LRP) for feature attribution-based explanation (ABX) for reconstructive neural network 110. Computer 100 may be one or more of a rack server such as a blade, a personal computer, a mainframe, a virtual computer, or other computing device.

1.1 Reconstructive Neural Network

Computer 100 hosts in memory and operates reconstructive neural network 110 that is an artificial neural network (ANN) such as an autoencoder as discussed later herein. Depending on the embodiment, reconstructive neural network 110 may be functionally specialized to perform numeric or logistic regression, classification, dimensionality reduction, or other ML task.

Reconstructive neural network 110 may be applied to a tuple such as original tuple 131 to generate an inference such as a number, a class, a dense encoding of original tuple 131, or a binary (e.g. yes/no, true/false, positive/negative, outlier/normal) decision or detection. Simultaneous to inferencing (i.e. inference generation), reconstructive neural network 110 also generates reconstructed tuple 132 that is a more or less imperfect copy of original tuple 131 that can be analyzed in various ways for various purposes as discussed later herein.

Herein, reconstructed tuple 132 is a transient and/or internal artifact that need not be provided to a domain-specific software application that uses reconstructive neural network 110. It does not matter whether an embodiment of reconstructive neural network 110 contains or, as shown, does not contain components 132, 140, and 150 so long as the internals of reconstructive neural network 110 are accessible to and analyzable by computer 100. Reconstructive neural network 110 is not opaque.

In various embodiments, reconstructed tuple 132 is or is not an output of reconstructive neural model 110. Outputs of reconstructive neural network 110 include an inference and none, one, or both of: reconstructed tuple 132 and reconstruction error 150.

Reconstruction error 150 is a measured difference between tuples 131-132 as explained later herein. The semantics and functionality of an inference and its reconstruction error 150 depend on the application. In an embodiment, reconstruction error 150 is, by itself, the inference, such as when the inference is an anomaly score for anomaly detection as discussed later herein.

In an embodiment, reconstruction error 150 may be used as an uncertainty metric (that may be arithmetically reversed to establish a confidence metric). For example, a high uncertainty value of 0.8 may be subtracted from one to derive a confidence of: 1−0.8=0.2, which is low confidence. For example if reconstructive neural network 110 is a classifier, an inferred color (i.e. class) of blue may, based on reconstruction error 150, have a high or low confidence. For example, reconstruction error 150 may be interpreted as (or arithmetically scaled to) an uncertainty percentage.

In an embodiment, the inference instead is a dense encoding of original tuple 131. The dense encoding is narrower (i.e. consumes less space) than either of tuples 131-132 that have a same width (i.e. size in bytes).

1.2 Machine Learning Explainability (MLX)

As discussed later herein and although not shown, an explainer is a software component hosted by computer 100 to generate a respective explanation of why reconstructive neural network 110 generated an inference (not shown) for original tuple 131. Relevance propagation rules 161-162 are part of a layer-wise relevance propagation (LRP) explainer that generates a feature attribution-based explanation (ABX) as discussed later herein.

In various scenarios, a tuple, its corresponding inference, and/or reconstructive neural network 110 are reviewed for various reasons. For example, reconstruction error 150 being high may be suspicious or interesting and may be a reason to perform ML explainability (MLX) herein that can provide combinations of any of the following functionalities:

Explainability: The ability to explain why a given inference occurred for a tuple.

Interpretability: The level at which a human can understand the explanation.

What-If Explanations: Understand how changes in a tuple may or may not change the inference.

For example, the explanation may be needed for regulatory compliance. Likewise, the explanation may reveal an edge case that causes reconstructive neural network 110 to malfunction for which retraining with different data or a different hyperparameters configuration is needed.

1.3 Feature Engineering

Each of tuples 131-132 contains a respective value for each of features F1-F3 as shown in original tuple 131. For example as shown, the value of feature F1 in tuples 131-132 respectively are values OF1 and RF1 as shown. In an embodiment, original tuple 131 is, or is used to generate, a feature vector that reconstructive neural network 110 accepts as input and that contains more or less densely encoded values OF1-OF3.

Each of features F1-F3 has a respective datatype. For example, features F1 and F3 may or may not have a same datatype. A datatype may variously be: a) a number that is an integer or real, b) a primitive type such as a Boolean or text character that can be readily encoded as a number, c) a sequence of discrete values such as text literals that have a semantic ordering such as months that can be readily encoded into respective numbers that preserve the original ordering, or d) a category that enumerates distinct categorical values that are semantically unordered.

Categories are prone to discontinuities that may or may not seemingly destabilize reconstructive neural network 110 such that different categorical values for a same feature may or may not cause reconstructive neural network 110 to generate very different inferences. One categorical feature may be hash encoded into one number in a feature vector or n-hot or 1-hot encoded into multiple numbers. For example, 1-hot encoding generates a one for a categorical value that actually occurs in a tuple and also generates a zero for each possible categorical value that did not occur in the tuple.

Original tuple 131 may represent an instance of various objects in various embodiments. For example, original tuple 131 may be or represent a network packet, a record such as a database table row, or a log entry such as a line of text in a console output logfile. Likewise, features F1-F3 may be respective data fields, attributes, or columns that can occur in each object instance.

1.4 Reconstruction Error

Reconstruction error 150 is a measured difference between tuples 131-132. Because tuples 131-132 are composed of individual features F1-F3, a difference may be measured between an original value of a feature and a reconstructed value of the feature to calculate a respective reconstruction error for that feature. A respective reconstruction error may be measured for each of features F1-F3, and tuple reconstruction error 150 may contain or otherwise be based on those respective feature reconstruction errors. For example, the reconstruction error of feature F1 measures the difference between values OF1 and RF1.

Integration such as by summation, mean, or maximum of respective reconstruction errors of all features F1-F3 may be used by reconstruction residual cost function 140 to calculate reconstruction error 150 as a loss that measures how much relevant information did reconstructive neural network 110 lose when inferencing for original tuple 131. Loss is informally or mathematically the opposite of inference accuracy. That is, the higher is loss, the less reliably did reconstructive neural network 110 recognize original tuple 131. For anomaly detection, high loss, such as exceeding a threshold, may indicate that original tuple 131 is anomalous as discussed later herein.

In an embodiment, reconstruction residual cost function 140 calculates reconstruction error 150 by applying the following example reconstruction error formula.

$$\frac{1}{m}\sum_{i=1}^{m}(y_i - x_i)^2$$

The following terms have the following meanings in the above example reconstruction error formula.

m is a count of features (e.g. three for features F1-F3).

i is a one-based index of a feature (e.g. two for feature F2).

y is original tuple 131.

x is reconstructed tuple 132.

$y_i-x_i$ is the respective reconstruction error of feature i.

The above example reconstruction error formula calculates reconstruction error 150 as the average squared respective reconstruction error of each feature. Herein, reconstruction error 150 may contain and provide: a) a scalar aggregate reconstruction error value based on all features F1-F3 and/or b) a set of individual respective feature reconstruction errors.

If the value range of a feature i is inclusively from zero to one, then:

the value range of $y_i-x_i$ is inclusively from negative one to positive one, the value range of $(y_i-x_i)^2$ is inclusively from zero to one, the value range of the above reconstruction error formula is inclusively from zero to one, and the value range of reconstruction error 150 is inclusively from zero to one.

1.5 Neural Layers

Reconstructive neural network 110 is composed of a feed-forward sequence of neural layers. The first neural layer in the sequence is an input layer (not shown) that accepts original tuple 131 as input at time T1 as shown. The input layer has as many neurons as features in original tuple 131 (e.g. three for features F1-F3). Each of values OF1-OF3 are accepted as input by a respective input neuron in the input layer.

In an embodiment, feed forward means:

Neurons in a same layer are not connected to each other.

A previous layer is connected only to a next layer.

A neuron in a previous layer is connected to one or more (e.g. all) neurons in a next layer.

A neuron in a next layer is connected to one or more (e.g. all) neurons in a previous layer.

A connection between two neurons has a connection weight (e.g. zero to one) and is directed from the neuron in a previous layer to the neuron in the next layer.

In an embodiment, the following occurs during activation (i.e. inferencing):

The range of values OF1-OF3 is zero to one.

Each of values OF1-OF3 is the respective activation value of a respective neuron in the input layer.

The activation value of a connection between two neurons is the multiplicative product of the connection weight of the connection and the activation value of the neuron in a previous layer.

The activation value of a neuron in a next layer (i.e. not the input layer) is the arithmetic sum (or other arithmetic activation function) of activation values of all connections directed to the neuron from neurons in a previous layer.

1.6 Reconstruction Layer

Reconstruction layer 180 is the last neural layer in the sequence and contains at least reconstruction neurons 121-122. The output of reconstruction layer 180 is reconstructed tuple 132. Although not shown, reconstruction layer 180 contains one distinct reconstruction neuron for each of features F1-F3. For example, reconstruction neuron 121 may correspond to feature F1.

At time T2, values RF1-RF3 in reconstructed tuple 132 are set to the respective activation values of the respective reconstruction neurons in reconstruction layer 180. For example, value RF2 may be the activation value of reconstruction neuron 122. Thus, time T1 initiates feed-forward inferencing that finishes at time T2 when reconstructed tuple 132 is generated as the only output of reconstruction layer 180 and as an output of reconstructive neural network 110.

In an embodiment, reconstructed tuple 132 is the only output of reconstructive neural network 110. For example, reconstructive neural network 110 may be part of an anomaly detector that uses reconstruction residual cost function 140 to convert reconstructed tuple 132 into reconstruction error 150 that may directly be (or can be converted into) an anomaly score.

At time T3, reconstruction residual cost function 140 simultaneously accepts tuples 131-132 as two inputs. Based on both inputs, reconstruction residual cost function 140 calculates and, at time T4, outputs reconstruction error 150.

1.7 Element Relevance

Relevance is a measurement of how much did an element contribute to an output of reconstructive neural network 110, where the element may be a neuron, a neural connection, or one of features F1-F3. For example, feature relevances FR1-FR3 are the respective relevances of features F1-F3 in original tuple 131 due to values OF1-OF3. Because other original tuples may have other values for features F1-F3, the feature relevances of features F1-F3 may depend on which original tuple is used.

Likewise, the feature relevances of features F1-F3 may depend on the instance of reconstructive neural network 110 that may depend on differences such as neural network architecture, hyperparameters of reconstructive neural network 110, and the training corpus and training methodology. In other words, measured feature relevances are neither transferrable nor reusable due to sensitivity to so many variables.

Some examples of feature relevance may be counterintuitive. For example, two different original tuples may have identical reconstructed tuples or identical reconstruction error and yet have different feature relevances. Likewise, even when two original tuples are identical and the reconstructed tuples are identical, if different instances of reconstructive neural network 110 were respectively used for each original tuple, the feature relevances may differ.

ABX may be based on feature relevances FR1-FR3. For example, features F1-F3 may be ranked or filtered (i.e. excluded from) in an ABX explanation based on feature relevances FR1-FR3. For example, an explanation may identify: a) a top few features having highest relevance or b) all features having relevance above a threshold.

1.8 LRP

LRP is used to measure feature relevances FR1-FR3. Somewhat similar to training backpropagation, LRP performs arithmetic calculations while backwards traversing the sequence of neural layers in reconstructive neural network 110. That is, reconstructive layer 180 is traversed first, and the input layer is traversed last.

LRP assigns a respective relevance to each neuron and to each neural connection in recurrent neural network 110. LRP assigns relevance one neural layer at a time. A hidden layer is any neural layer that is not an output layer (e.g. reconstruction layer 180) and is not an input layer. In other words, a hidden layer is any layer that is neither the first layer nor the last layer in the sequence of neural layers in reconstructive neural network 110.

1.9 Relevance Propagation Rules

LRP assigns relevances within a hidden layer or an input layer by applying a relevance propagation rule from layer-specific relevance propagation rules 162. Each relevance propagation rule in layer-specific relevance propagation rules 162 is specialized for a respective distinct kind of neural layer. In an embodiment, recurrent neural network 110 is a deep neural network (DNN) that contains many hidden layers of same or different kinds. A same relevance propagation rule may be reused for all neural layers of a same kind. Depending on the embodiment, layer-specific relevance propagation rules 162 contain specialized relevance propagation rules for some or all of the following kinds of neural layers:

Fully-connected layer: provides general-purpose (e.g. low level) learning such as edge detection.

Convolutional layer: detects occurrence(s) of a high-level semantic feature. For example, a convolutional layer may be an eye detector that can detect none, one, or two eyes in an image of a face.

Pooling layer: reduces dimensionality by demagnifying (i.e. zooming out). For example, optical character recognition (OCR) may be more reliable if a pooling layer fits at most one text character per represented cell, even if a text character is actually composed of dozens of pixels. Pooling prevents overfitting that may be confused by various naturally-occurring affine transforms (e.g. distortions) such as slight rotation.

In an embodiment of layer-specific relevance propagation rules 162, a relevance propagation rule that is specialized for fully connected layers may apply the following example layer formula.

$$R_{i \leftarrow k}^{(l,l+1)} = R_k^{(l+1)} \frac{a_i w_{ik}}{\sum_h a_h w_{hk}}$$

The following terms have the following meanings in the above example layer formula.

l is a previous neural layer.

l+1 is a next neural layer.

i is a neuron in the previous neural layer.

k is a neuron in the next neural layer.

a is the activation value of a given neuron.

w is the weight of the connection between two given neurons (e.g. zero means not connected).

$$R_{i \leftarrow k}^{(l,l+1)}$$

is the relevance received by neuron i (from layer l) from neuron k (from layer l+1)

$$R_k^{(l+1)}$$

is the relevance of neuron k (from layer l+1)

1.10 Reconstruction Relevance

Because relevance propagates backwards through the sequence of neural layers, the neuron relevances of the next neural layer is measured before measuring the neuron relevances of the previous neural layer. Thus, the input layer is the last neural layer to have neuron relevances measured. The first neural layer to have neuron relevances measured is the output layer (i.e. reconstructive layer 180), which is a technical challenge for two reasons. First, reconstructive layer 180 is the last neural layer and has no next neural layer from which to propagate relevances. Second, reconstruction layer is a kind of neural layer for which layer-specific relevance propagation rules 162 has no specialized relevance propagation rule.

Herein, novel reconstructive relevance propagation rule 161 is specialize for reconstruction layers and used to measure neuron relevances in reconstruction layer 180. In an embodiment, reconstructive relevance propagation rule 161 applies the following novel example relevance formula.

$$R_{i \leftarrow re}^{(l,l+1)} = \frac{1}{m}(y_i - x_i)^2$$

An arithmetic foundation for the above example relevance formula is presented later herein. The term i in the above example relevance formula indexes a given feature (e.g. F2). The other terms in the above example relevance formula have same meanings as discussed earlier herein for the example reconstruction error formula. When i is two, the above example relevance formula measures reconstruction relevance 172 of reconstruction neuron 122 based on a difference, as part of reconstruction error 150, between values OF2 and RF2.

The above example relevance formula is not based on: a connection weight between two neurons, nor an activation value of a neuron.

At time T5, reconstructive relevance propagation rule 161 accepts, as input, reconstruction error 150 that contains the set of respective reconstruction errors of features F1-F3. At time T6, reconstructive relevance propagation rule 161 assigns respective reconstruction relevances to all reconstruction neurons in reconstruction layer 180 as discussed above.

At time T7, neuron relevances in all neural layers other than reconstruction layer 180 are measured according to LRP by layer-specific relevance propagation rules 162. This includes assigning a respective relevance to each input neuron in the first (i.e. input) neural layer of reconstructive neural network 110. At time T8, the neuron relevance of each input neuron is assigned to a respective one of feature relevances FR1-FR3 from which an ABX explanation may be automatically generated to explain why applying reconstructive neural network 110 to original tuple 131 caused reconstructed tuple 132.

2.0 Deep Taylor Decomposition (DTD) for Neural Layer

FIG. 2 depicts arithmetic equalities for a deep Taylor decomposition (DTD) of the example layer formula presented earlier herein, by performing the decomposition at the first order. DTD 202 decomposes the relevance of a neuron from a previous layer l into relevances of neurons from next layer l+1. The following terms have the following meanings in DTD 202.

j is neuron from layer l+1.

$R_j$ is the relevance of neuron j.

i is a neuron from the layer l.

$\{x_i\}$ is the activation values of all neurons in neural layer l.

$f_{R_j}(\ )$ is any function that maps the activation values of all neurons from neural layer l to the relevance of a neuron j from neural layer l+1.

$$\{\bar{x}_i\}^{(j)}$$

is any root point corresponding to neuron j from layer l+1.

T is transposition.

ε is a Taylor residual.

A root point is an input for which a function yields a null value. A root point is any tuple that reconstructive neural network 110 can accept as input.

The following is an example multi-layer formula that calculates the relevances of neurons in neural layer l as a sum of relevances of neurons in a neural layer that is immediately after neural layer l.

$$R_i = \sum_j R_{i \leftarrow j}$$

The following terms have the following meanings in the above example multi-layer formula.

i is a neuron from previous layer l.

j is a neuron from next layer l+1.

$R_{i \leftarrow j}$ is the relevance received by neuron i (in layer l) from neuron j (in layer l+1).

In DTD 204 that combines the above example multi-layer formula with DTD 202, the meaning of the terms are the same as in the above example multi-layer formula and DTD 202.

3.0 DTD for Reconstruction Error

FIG. 3 depicts arithmetic equalities for a DTD of the example reconstruction error formula presented earlier herein. Novel reconstruction relevance propagation rule 161 and its example relevance formula presented earlier herein are based on applying DTD to the example reconstruction error formula presented earlier herein.

The following terms have the following meanings in DTD 300.

$R_{re}$ is the relevance to be propagated through the neural network and initialized as reconstruction error 150.

$$R_{i \leftarrow re}^{\square}$$

is the relevance received by neuron i from re (reconstruction error 150).

x is reconstructed tuple 132.

r( ) is reconstruction residual cost function 140.

y is original tuple 131.

ε is a Taylor residual.

H is the Hessian matrix of reconstruction residual cost function 140 with respect to original tuple 131.
    i is each of features F1-F3.
    m is a count of features (e.g. three for features F1-F3).

The Hessian matrix is taught in non-patent literature (NPL) "EXACT CALCULATION OF THE HESSIAN MATRIX FOR THE MULTI-LAYER PERCEPTRON," by Christopher M. Bishop. In DTD 300, reconstruction error 150 is presumed to be zero (i.e. perfect reconstruction) for a root point. Thus, the root point presumes that tuples 131-132 are identical. In that case, original tuple 131 is the root point.

Each of DTDs 202, 204, and 300 and each of relevance propagation rules 161-162 should satisfy the following layer conservation axiom that requires that each neural layer in a sequence of neural layers has a same total neuron relevance.

$$\sum_i R_i^{(l)} = \sum_k R_k^{(l+1)}$$

The following terms have the following meanings in the above layer conservation axiom.
    l is a previous neural layer.
    l+1 is a next neural layer.
    i is each neuron in the previous neural layer.
    k is each neuron in the next neural layer.
    R is the neuron relevances in a given neural layer.

Each of DTDs 202, 204, and 300 and each of relevance propagation rules 161-162 should satisfy the following global conservation axiom that requires that all neuron relevances in reconstructive neural network 110 collectively and exactly specify how reconstructive neural network 110 generated reconstructed tuple 132 from original tuple 131.

$$f(x) = \sum_i R_i^{(l)}$$

The following terms have the following meanings in the above global conservation axiom.
    l is each neural layer in reconstructive neural network 110.
    i is each neuron in a given neural layer.

$$R_i^{(l)}$$

is the relevance of neuron i from layer l.
    x is original tuple 131.
    f(x) is reconstruction error 150.

4.0 Example Reconstruction Relevance Propagation Process

FIG. 4 is a flow diagram that depicts an example process that an embodiment of computer 100 may perform to use novel reconstructive relevance propagation rule 161 in layer-wise relevance propagation (LRP) for feature attribution-based explanation (ABX) for reconstructive neural network 110. FIG. 4 is discussed with reference to FIG. 1.

The process of FIG. 4 occurs in two phases. An inference phase performs steps 402 and 404. An explanation phase performs steps 406 and 408. The inference phase is caused by applying reconstructive neural network 110 to original tuple 131 at time T1.

In step 402 at time T2 during feed-forward operation, reconstruction layer 180 generates reconstructed tuple 132 that is based on original tuple 131 as discussed earlier herein.

In step 404 at time T4, reconstruction residual cost function 140 calculates reconstruction error 150 that measures differences between tuples 131-132, including a respective difference for each of features F1-F3 and an aggregate difference as an arithmetic sum or average of respective differences of all features.

An arbitrarily long duration may separate the inference phase from the explanation phase. For example, the inference phase may occur on one computer, and the explanation phase may occur on another computer. The respective difference for each of features F1-F3 as generated by the inference phase should be (e.g. durably) retained as part of reconstruction error 150 for use by the explanation phase that occurs when an explanation is sought for why reconstructive neural network 110 regenerated original tuple 131 as reconstructed tuple 132.

To reconstruction error 150 at time T6, step 406 applies novel reconstruction relevance propagation rule 161 that assigns respective reconstruction relevances to each reconstruction neuron in reconstruction layer 180.

Novel reconstruction relevance propagation rule 161 and its example relevance formula presented earlier herein are based on applying deep Taylor decomposition (DTD) 300 to the example reconstruction error formula presented earlier herein.

Based on reconstruction relevances of reconstruction neurons at time T7, step 408 performs LRP to measure respective neuron relevance for each neuron in each neural layer, backwards in sequence, excluding reconstruction layer 180 as discussed earlier herein. At time T8 and based on that LRP from reconstruction layer 180, step 408 determine respective feature relevance of each of features F1-F3 as discussed earlier herein.

Step 408 may measure and use feature relevances FR1-FR3 to generate an ABX explanation of why reconstructive neural network 110 regenerated original tuple 131 as reconstructed tuple 132, which does not necessarily mean that the explanation contains any part of tuples 131-132. In an embodiment, the explanation identifies only feature(s). In an embodiment, the explanation also contains: a) some or all of values OF1-OF3 of original tuple 131 and/or b) respective reconstruction error(s) of some or all of features F1-F3 that are part of reconstruction error 150. In an embodiment, data in the explanation is ranked/sorted per respective reconstruction error(s) of some or all of features F1-F3.

Other approaches may need a predefined reference tuple, that is neither of tuples 131-132, for calibration. The process of FIG. 4, including steps 406 and 408, does not use a reference tuple.

5.0 Example LRP Process for Database Security

Figure 5:
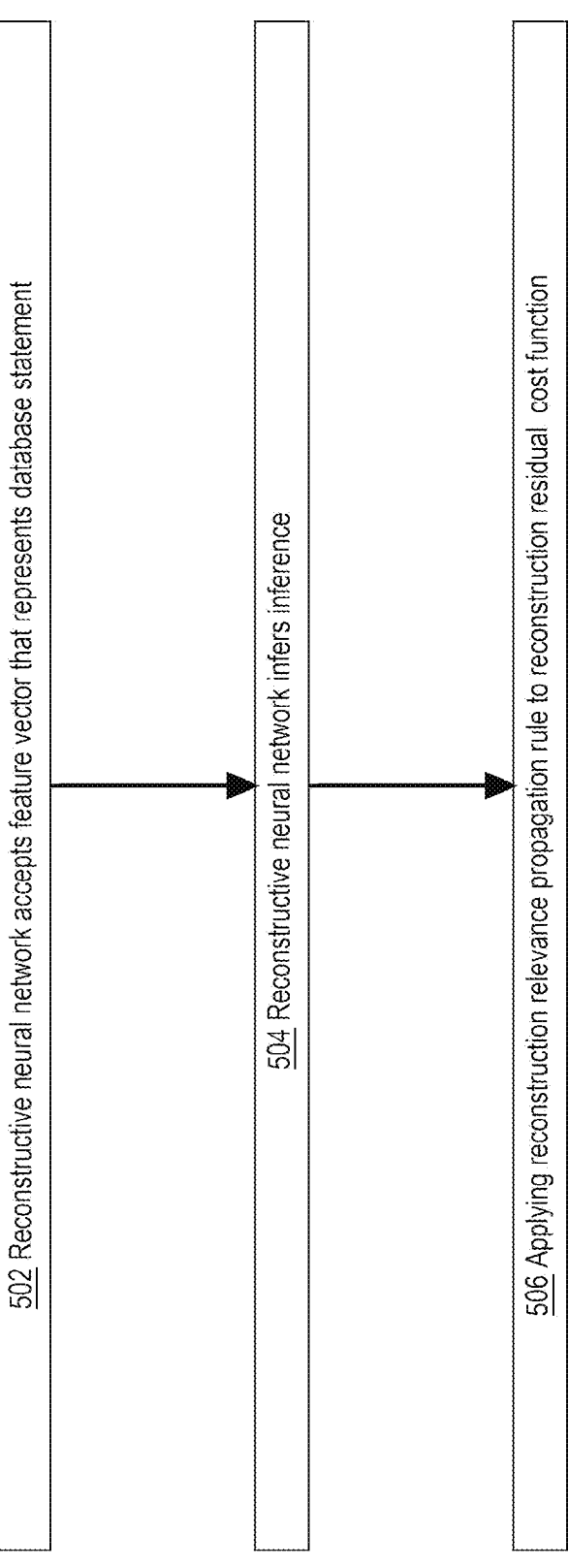
FIG. 5 is a flow diagram that depicts an example computer process that applies LRP for a database security application.

FIG. 5 is a flow diagram that depicts an example process that an embodiment of computer 100 may perform to apply LRP for a database security application. FIG. 5 is discussed with reference to FIG. 1. The steps of FIGS. 4-5 are complementary and may be interleaved or combined.

In various embodiments, reconstructive neural network 110 is or is part of some or all of: an autoencoder, an anomaly detector, an unsupervised trained reconstructive neural network, and a reconstructive neural network that accepts a feature vector that represents a database statement. Unsupervised training uses an unlabeled training corpus.

In step 502 at time T1, reconstructive neural network 110 accepts original tuple 131 as a feature vector that represents a database statement. The following Table 1 provides examples of features that may occur in tuples that each represent a respective database statement in a log of a database server.

| | Theme | Feature | Meaning |
|---|---|---|---|
| 531 | Database connection and database session | F1 | All or part of a connection URL of ODBC or JDBC |
| | | F2 | Session duration |
| 532 | Kind of database statement | F3 | Language |
| | | F4 | Verb |
| | | F5 | State |
| 533 | Result of statement | F6 | Error code |
| | | F7 | Rows returned |

In above Table 1 for theme 531, feature F1 may be or contain a part of an open database connectivity (ODBC) or Java ODBC (JDBC) uniform resource locator (URL) that was used to establish a network connection and a database session. Example connection string parts include standard URL parts (e.g. protocol, server host, and network port number) and ODBC/JDBC specific parts in the path or query parameters such as a name of a database, schema, or user account. Feature F2 may indicate how old was the database session when the session issued the database statement.

In above Table 1 for theme 532, feature F3 may be a 1-hot encoding of the dialect of structured query processing language (SQL) of the database statement such as data definition language (DDL), data manipulation language (DML), data query language (DQL), and transaction control language (TCL). Feature F4 may be a 1-hot encoding of the verb of the database statement such as SELECT, INSERT, DELETE, UPDATE, CREATE, DROP, GRANT, BEGIN, and COMMIT. Feature F5 may be an n-hot encoding of the state or context of the database statement such as: outside of a transaction, inside a demarked transaction, auto-committed transaction, and prepared statement.

In above Table 1 for theme 533, feature F6 may be a return code of the database statement such as an error code. Feature F7 may be a count of rows in the result set returned by the database statement.

Other examples not shown in Table 1 include a schema theme that contains features such as an n-hot encoding of database tables referenced by a database statement. A query criteria theme may contain features that describe a WHERE clause such as a count of joins specified, a LIMIT clause on results, a sorting direction, and the DISTINCT keyword.

In step 504 at time T2, reconstructive neural network 110 simultaneously generates two outputs: reconstructed tuple 132 and an inference. In this example, the inference is a dense encoding of original tuple 131. In two ways, the dense encoding is narrower than either of tuples 131-132. First, the dense encoding has fewer bytes. Second, the dense encoding has fewer features. An anomaly detector may analyze the dense encoding to generate an anomaly score for original tuple 131.

Computer 100 could optionally use a known ABX explainer to generate an explanation of why reconstructive neural network 110 generated the dense encoding for original tuple 131. For example, the explainer could implement Shapley additive explanation (SHAP) as presented in non-patent literature (NPL) "A Unified Approach to Interpreting Model Predictions" published by Scott Lundberg et al in Advances In Neural Information Processing Systems 30 (2017) that is incorporated in its entirety herein. SHAP entails intractable combinatorics that, merely for one original tuple 131, involves temporarily generating exponentially more synthetic exploratory tuples than features in original tuple 131. In other words, SHAP needs much time and space, which is unsuited for interactive scenarios such as telephone support for a customer.

In stark contrast, step 506 can generate, in one or two orders of magnitude faster than SHAP, an ABX explanation of why reconstructive neural network 110 generated reconstructed tuple 132 for original tuple 131. Step 506 performs LRP, including applying reconstruction relevance propagation rule 161 to reconstruction residual cost function 140 that compares tuples 131-132. The example relevance formula presented earlier herein is repeated for each of features F1-F3, which is more or less the same as step 506 applying reconstruction relevance propagation rule 161 to the example reconstruction error formula presented earlier herein.

6.0 Example Pseudocode

An embodiment of computer 100 may or may not implement the following example pseudocode listing 1 that performs LRP on reconstructive neural network 110 as discussed earlier herein.

Listing 1: Backpropagation-based Explanation
for Anomaly Detection Autoencoders

```
Input:   model ← model to be used for the prediction which needs to be explained
         alpha ← the α parameter from the LRP-αβ rule
         datapoint ← the datapoint for which the anomaly score should be explained
Output: relevances ← the relevance scores of the input feature of the datapoint
1   Function ExplainPrediction(model, datapoint, alpha):
2       /* Explains the prediction for a given datapoint
        */
3
4       // Retrieve network parameters
5       layerNames, activations, weights ← GetNetworkParameters(model)
6       numLayers ← layerNames.length
7
8       // Define beta
9       beta ← 1 - alpha
10
11      // Build relevance propagation graph
12      relevance ← BuildRelevancePropagationGraph(model, weights, activations,
          layerNames, numLayers, alpha, beta)
13
14      // Graph of computations which maps the datapoint to its relevance scores
15      f ← function(inputs=model.input, outputs=relevance)
16
17      return f(datapoint)
```

An embodiment of computer 100 may or may not implement the following example pseudocode listing 2 that defines a helper subroutine that facilitates LRP on reconstructive neural network 110 as discussed earlier herein.

---

Listing 2: Helpers functions for the Relevance Propagation (1/2)

```
1   Function BuildRelevancePropagationGraph(model, weights, activations,
        layerNames, numLayers, alpha, beta):
2       /* Builds Computational Graph for Relevance Propagation
        */
3
4       // Propagate relevances to the output neurons of the Autoencoder
            using the DTD Formula
5       r = DTDResCostFunction(model.input, model.output)
6
7       // Propagate relevances through the layers of the Autoencoder
8       for i in range(numLayers − 2, −2, −1) do
9
10          // Case first layer
11          if i ==−1 then
12              r ← LRPFullyConnectedLayer(weights[i + 1][o], model.input, r, alpha, beta)
13
14          // Case fully connected layer
15          else if 'dense' in layerNames[i + 1] then
16              r ← LRPFullyConnectedLayer(weights[i + 1][o], activations[i], r, alpha, beta)
17
18          // Case non compatible layer
19          else
20              raise Exception("Error: layer type not recognized.")
21          end if
22
23      end for
24      return r
```

---

An embodiment of computer 100 may or may not implement the following example pseudocode listing 3 that defines helper subroutines that facilitates LRP on reconstructive neural network 110 as discussed earlier herein.

---

Listing 3: Helpers functions for the Relevance Propagation (2/2)

```
1    Function GetNetworkParameters(model):
2        /* Gets the network parameters - layer names, activations and names,
             each being lists of size equal to the number of the network's
             layers                                                        *
             /
3
4        layerNames ← [ ]
5        activations ← [ ]
6        weights ← [ ]
7        for layer in model.layers do
8            layerNames.append(layer.name)
9            activations.append(layer.output)
10           weights.append(layer.getWeights( ))
11       end for
12       return layerNames, activations, weights
13
14   Function LRPFullyConnectedLayer(w, a, r, alpha, beta):
15       /* Propagates the relevance through a fully connected layer using the
             LRP-αβ rule
                                                                           *

/
16
17       // Positive relevance
18       wP ← max(w,o)
19       zP ← dotProduct(a, wP)
20       sP ← r / zP
21       cP ← dotProduct(sP, wP.transpose( ))
22
23       // Negative relevance
24       wN ← min(w,o)
25       zN ← dotProduct(a, wN)
26       sN ← r / zN
27       cN ← dotProduct(sN, wN.transpose( ))
28
29       // Final Relevance
30       rel ← a * (alpha * cP + self.beta * cN)
31       return rel
```

-continued

| Listing 3: Helpers functions for the Relevance Propagation (2/2) |
|---|

```
32
33      Function DTDResidualCostFunction(AEInput, AEOutput):
34          /* Propagates the relevance through the residual cost function using
            the Deep Taylor Decomposition formula
            Eq.                         15                      *
            /
35
36          rel ← (AEOutput - AEInput)² / (AEOutput.shape[1])
37          return rel
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
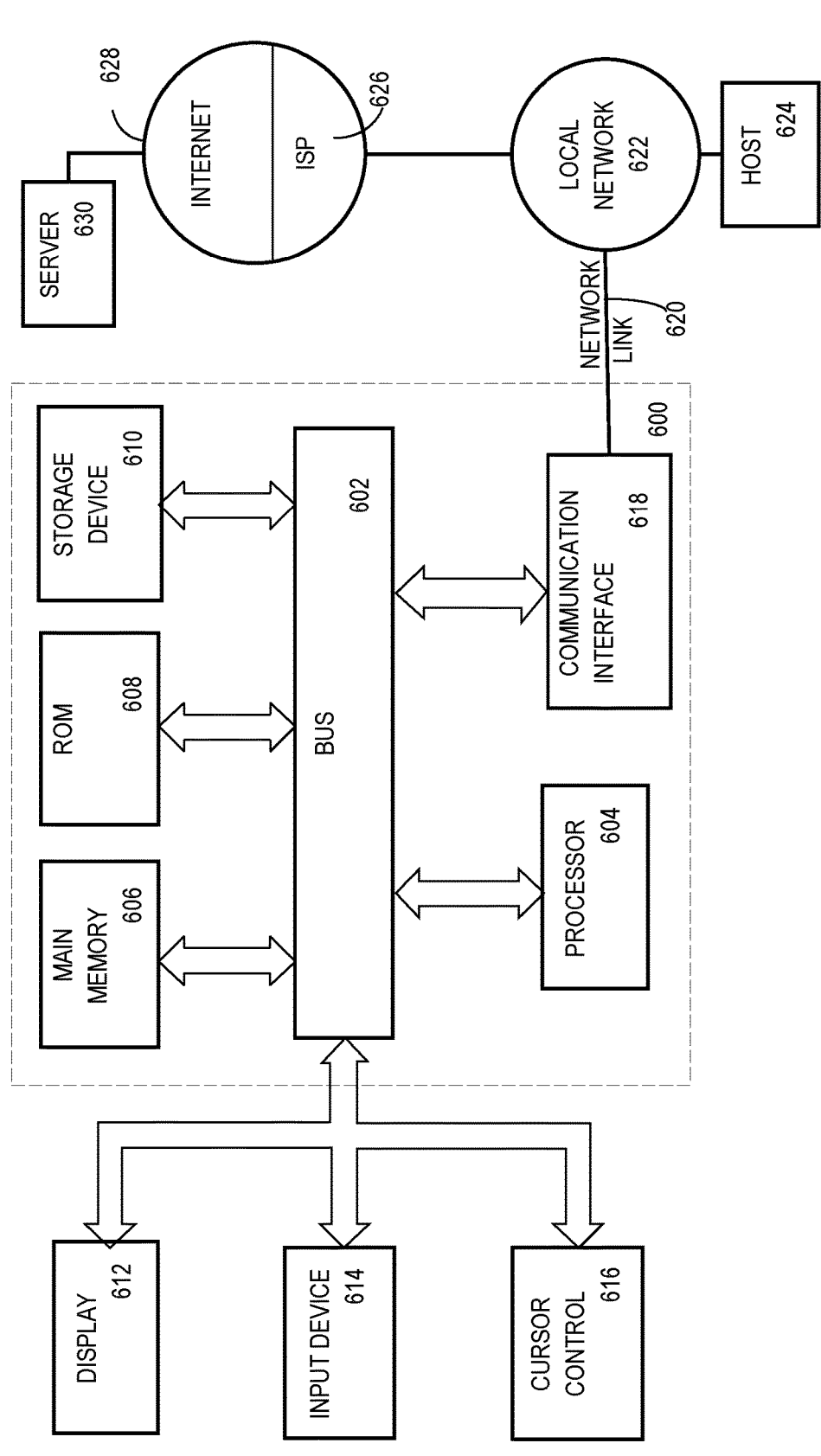
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as discussed above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

detecting from an original tuple that contains a plurality of features, by a reconstructive neural network, that the original tuple represents an anomalous database statement;

generating, by a reconstruction layer of the reconstructive neural network, a reconstructed tuple that is based on the original tuple;

calculating, by a reconstruction residual cost function, a reconstruction error that measures a difference between the original tuple and the reconstructed tuple;

applying, to the reconstruction error, a reconstruction relevance propagation rule that assigns a respective reconstruction relevance to each of multiple reconstruction neurons in the reconstruction layer;

determining, based on the reconstruction relevances of the multiple reconstruction neurons, a respective feature relevance of each feature in the plurality of features; and generating and displaying an explanation of why the reconstructive neural network detected the anomalous database statement;

wherein the method is performed by one or more computers.

2. The method of claim 1 wherein applying the reconstruction relevance propagation rule comprises applying the reconstruction relevance propagation rule to the reconstruction residual cost function.

3. The method of claim 1 wherein:

two steps of the method do not depend on a reference tuple that is not the original tuple;

the two steps of the method are:

said applying the reconstruction relevance propagation rule, and said determining the respective feature relevance of each feature in the plurality of features.

4. The method of claim 1 wherein the reconstruction relevance propagation rule is based on deep Taylor decomposition (DTD).

5. The method of claim 4 wherein the DTD satisfies a conservation axiom.

6. The method of claim 5 wherein the conservation axiom is one selected from the group consisting of:

a layer-wise conservation axiom, and a global conservation axiom.

7. The method of claim 4 wherein the DTD is based on using the original tuple as a root point.

8. The method of claim 1 wherein the reconstruction relevance propagation rule is based on none of:

a connection weight between two neurons, and an activation value of a neuron.

9. The method of claim 1 wherein the reconstructive neural network is an autoencoder.

10. The method of claim 1 wherein:

performing two steps of the method has less time complexity than Shapley additive explanation (SHAP);

the two steps of the method are:

said applying the reconstruction relevance propagation rule, and said determining the respective feature relevance of each feature in the plurality of features.

11. One or more non-transitory computer-readable media storing instructions that, when executed by one or more processors, cause:

detecting from an original tuple that contains a plurality of features, by a reconstructive neural network, that the original tuple represents an anomalous database statement;

generating, by a reconstruction layer of the reconstructive neural network, a reconstructed tuple that is based on the original tuple;

calculating, by a reconstruction residual cost function, a reconstruction error that measures a difference between the original tuple and the reconstructed tuple;

applying, to the reconstruction error, a reconstruction relevance propagation rule that assigns a respective reconstruction relevance to each of multiple reconstruction neurons in the reconstruction layer;

determining, based on the reconstruction relevances of the multiple reconstruction neurons, a respective feature relevance of each feature in the plurality of features; and generating and displaying an explanation of why the reconstructive neural network detected the anomalous database statement.

12. The one or more non-transitory computer-readable media of claim 11 wherein applying the reconstruction relevance propagation rule comprises applying the reconstruction relevance propagation rule to the reconstruction residual cost function.

13. The one or more non-transitory computer-readable media of claim 11 wherein said applying the reconstruction relevance propagation rule does not depend on a reference tuple that is not the original tuple.

14. The one or more non-transitory computer-readable media of claim 11 wherein the reconstruction relevance propagation rule is based on deep Taylor decomposition (DTD).

15. The one or more non-transitory computer-readable media of claim 14 wherein the DTD satisfies a conservation axiom.

16. The one or more non-transitory computer-readable media of claim 15 wherein the conservation axiom is one selected from the group consisting of:

a layer-wise conservation axiom, and a global conservation axiom.

17. The one or more non-transitory computer-readable media of claim 14 wherein the DTD is based on using the original tuple as a root point.

18. The one or more non-transitory computer-readable media of claim 11 wherein the reconstruction relevance propagation rule is based on none of:

a connection weight between two neurons, and an activation value of a neuron.

19. The one or more non-transitory computer-readable media of claim 11 wherein the reconstructive neural network is an autoencoder.

* * * * *